(12) United States Patent
Brondolin

(10) Patent No.: US 9,829,108 B2
(45) Date of Patent: Nov. 28, 2017

(54) DIE CASTING PISTON AND RING ASSEMBLY

(71) Applicant: Brondolin S.P.A., Cassano Magnago (IT)

(72) Inventor: Davide Brondolin, Gallarate (IT)

(73) Assignee: BRONDOLIN S.P.A., Cassano Magnago (IT)

(*) Notice: Subject to any disclaimer, the term of this patent is extended or adjusted under 35 U.S.C. 154(b) by 281 days.

(21) Appl. No.: 14/592,738

(22) Filed: Jan. 8, 2015

(65) Prior Publication Data

US 2015/0114219 A1   Apr. 30, 2015

Related U.S. Application Data

(63) Continuation of application No. 13/145,695, filed as application No. PCT/IB2010/050216 on Jan. 18, 2010, now Pat. No. 8,931,395.

(51) Int. Cl.
| | |
|---|---|
| F16J 15/34 | (2006.01) |
| B22D 17/20 | (2006.01) |
| F16J 1/00 | (2006.01) |
| F16J 9/14 | (2006.01) |
| F16J 15/3268 | (2016.01) |

(Continued)

(52) U.S. Cl.
CPC ............. *F16J 15/34* (2013.01); *B22D 17/08* (2013.01); *B22D 17/203* (2013.01); *F16J 1/008* (2013.01); *F16J 1/04* (2013.01); *F16J 9/14* (2013.01); *F16J 15/3268* (2013.01); *F16J 15/3272* (2013.01); *F16J 15/56* (2013.01)

(58) Field of Classification Search
CPC ........ F16J 1/04; F16J 1/008; F16J 9/14; F16J 15/3268; F16J 15/3272; F16J 15/34; F16J 15/56; B22D 17/08; B22D 17/203
See application file for complete search history.

(56) References Cited

U.S. PATENT DOCUMENTS 1,369,592 A  2/1921  White
1,434,520 A  11/1922  Ball
(Continued)

FOREIGN PATENT DOCUMENTS

DE  2904883 B1  7/1979
DE  3323328 C1  5/1984
(Continued)

OTHER PUBLICATIONS

Anonymous, "Tabbed Seal," Research Disclosure, Mason Publications, Hampshire, GB; vol. 391, No. 37, Nov. 1, 1996; XP007121402; ISSN: 0374-4353.

(Continued)

*Primary Examiner* — Logan Kraft
(74) *Attorney, Agent, or Firm* — Greer, Burns & Crain, Ltd.

(57) ABSTRACT

The invention relates to a die casting ring (1) internally fitted with radial teeth (11) to be engaged into matching seats (22) provided on a piston (2). This piston-ring assembly prevents mutual rotation or axial translation, in addition to ensuring an optimal seal against infiltration of liquid metal during the die casting process. When the ring has a cutout (10), it can be mounted accurately onto the piston because the teeth (11) allow the cutout to be positioned anywhere relative to the piston.

22 Claims, 7 Drawing Sheets

(51) Int. Cl.
*F16J 15/3272* (2016.01)
*F16J 15/56* (2006.01)
*B22D 17/08* (2006.01)
*F16J 1/04* (2006.01)

(56) References Cited

U.S. PATENT DOCUMENTS

| | | |
|---|---|---|
| 2,409,852 A | 10/1946 | Harrah |
| 2,823,106 A | 2/1958 | Pierson |
| 2,867,521 A | 1/1959 | Jeffreys |
| 3,997,437 A | 12/1976 | Prince et al. |
| 4,076,515 A | 2/1978 | Rickard |
| 4,289,625 A | 9/1981 | Tarman et al. |
| 4,311,185 A | 1/1982 | Zimmerman |
| 4,342,650 A | 8/1982 | Erickson et al. |
| 4,354,936 A | 10/1982 | Ishida et al. |
| 4,655,925 A | 4/1987 | Tabata et al. |
| 4,818,405 A | 4/1989 | Vroom et al. |
| 4,842,039 A | 6/1989 | Kelm |
| 4,917,805 A | 4/1990 | Reid |
| 4,932,314 A * | 6/1990 | Baris ............ F16J 1/04 123/193.6 |
| 5,048,592 A | 9/1991 | Mueller |
| 5,076,928 A | 12/1991 | Ballnus |
| 5,233,912 A | 8/1993 | Mueller |
| 5,269,947 A | 12/1993 | Baskis |
| 5,352,357 A | 10/1994 | Perry |
| 5,360,553 A | 11/1994 | Baskis |
| 5,543,061 A | 8/1996 | Baskis |
| 5,582,732 A | 12/1996 | Mao et al. |
| 5,616,241 A | 4/1997 | Khudenko |
| 5,647,986 A | 7/1997 | Nawathe et al. |
| 5,651,890 A | 7/1997 | Trost |
| 5,702,572 A | 12/1997 | Fujimura et al. |
| 5,863,433 A | 1/1999 | Behrends |
| 5,979,298 A | 11/1999 | Whitacre |
| 5,989,428 A | 11/1999 | Goronszy |
| 6,065,224 A | 5/2000 | Eigner |
| 6,096,214 A | 8/2000 | Ripley |
| 6,254,775 B1 | 7/2001 | McElvaney |
| 6,299,774 B1 | 10/2001 | Ainsworth et al. |
| 6,315,904 B1 | 11/2001 | Rose et al. |
| 6,325,935 B1 | 12/2001 | Hojsgaard |
| 6,383,389 B1 | 5/2002 | Pilgram et al. |
| 6,569,332 B2 | 5/2003 | Ainsworth et al. |
| 6,585,895 B2 | 7/2003 | Smith et al. |
| 6,610,205 B2 | 8/2003 | Sato et al. |
| 6,830,690 B2 | 12/2004 | Schmid |
| 6,942,798 B2 | 9/2005 | Miller, III |
| 7,005,068 B2 | 2/2006 | Hoffland |
| 7,144,507 B2 | 12/2006 | Baskis |
| 7,160,713 B2 | 1/2007 | Suominen |
| 7,314,190 B2 | 1/2008 | Palm |
| 7,416,668 B1 | 8/2008 | Theodore |
| 7,481,940 B2 | 1/2009 | Clifford, III et al. |
| 7,485,230 B2 | 2/2009 | Magner et al. |
| 7,563,374 B2 | 7/2009 | McWhirter et al. |
| 7,604,744 B2 | 10/2009 | Baskis et al. |
| 7,638,314 B2 | 12/2009 | Zappi et al. |
| 2004/0050777 A1 | 3/2004 | Khan |
| 2008/0009055 A1 | 1/2008 | Lewnard |
| 2008/0050800 A1 | 2/2008 | McKeeman et al. |
| 2008/0050801 A1 | 2/2008 | Kelly et al. |
| 2008/0135474 A1 | 6/2008 | Limcaco |
| 2008/0135475 A1 | 6/2008 | Limcaco |
| 2008/0223783 A1 | 9/2008 | Sutton |
| 2008/0311640 A1 | 12/2008 | Cox et al. |
| 2009/0071326 A1 | 3/2009 | Schivalocchi et al. |
| 2009/0139683 A1 | 6/2009 | Muller et al. |
| 2009/0227003 A1 | 9/2009 | Blotsky et al. |
| 2011/0165638 A1 | 7/2011 | Kotelko et al. |

FOREIGN PATENT DOCUMENTS

| | | |
|---|---|---|
| DE | 3934778 A1 | 7/1990 |
| DE | 4019076 A1 | 12/1991 |
| DE | 19938075 A1 | 10/2000 |
| DE | 102005048717 A1 | 4/2007 |
| EP | 0423413 A2 | 4/1991 |
| EP | 1197279 A2 | 4/2002 |
| GB | 484931 | 5/1938 |
| GB | 551855 | 3/1943 |
| JP | 7-308688 | 11/1995 |
| JP | 8-224590 | 9/1996 |
| JP | 2004-167461 | 6/2004 |
| JP | 2006212696 A | 8/2006 |
| WO | 03074211 A2 | 9/2003 |
| WO | 03074211 A3 | 9/2003 |
| WO | 2007042282 A2 | 4/2007 |
| WO | 2007116426 A1 | 10/2007 |
| WO | 2010084449 A1 | 7/2010 |

OTHER PUBLICATIONS

European Patent Office, Written Opinion of International Searching Authority for PCT/IB2010/050216 dated May 6, 2010.

European Patent Office, International Preliminary Report on Patentability for PCT/IB2010/050216 dated Jul. 26, 2011.

European Patent Office, International Search Report for PCT/IB2010/050216 dated May 6, 2010.

Argaw, N.; "Renewable Energy in Water and Wastewater Treatment Applications; Period of Performance Apr. 1, 2001-Sep. 1, 2001"; National Renewable Energy Laboratory; NREL/SR-500-30383; Jun. 2003.

* cited by examiner

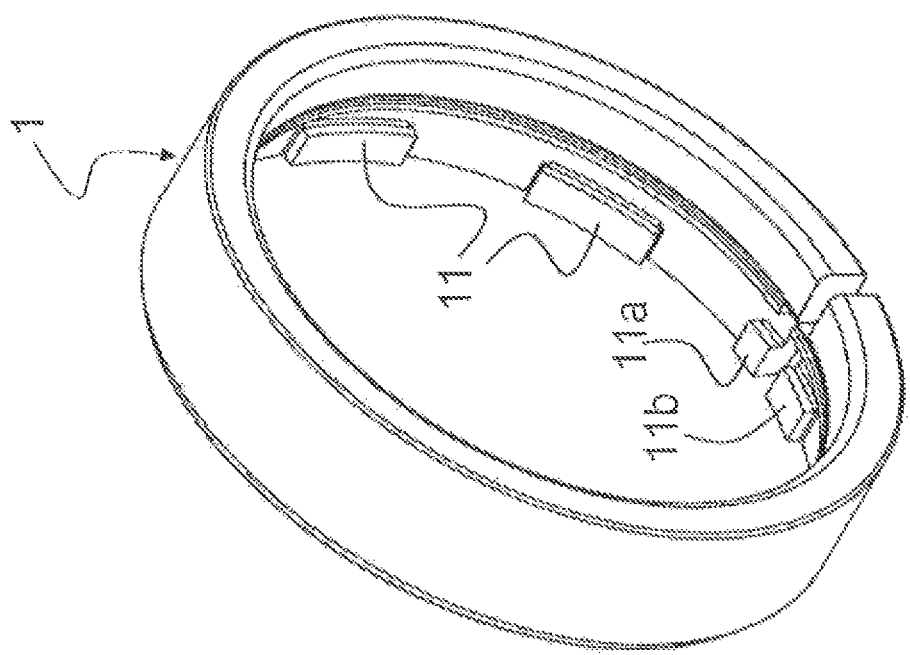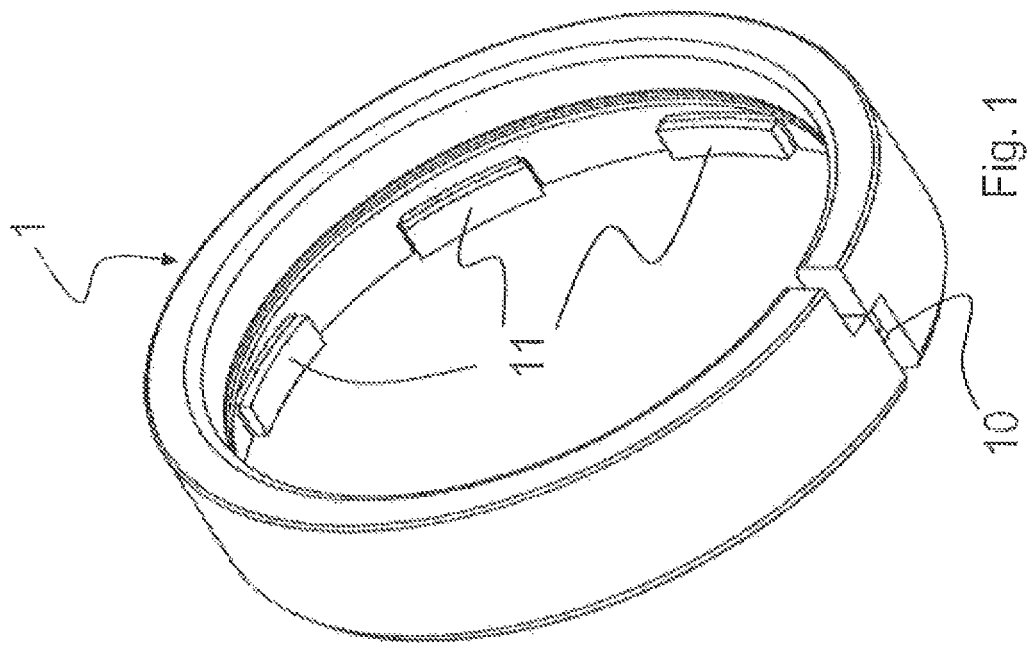

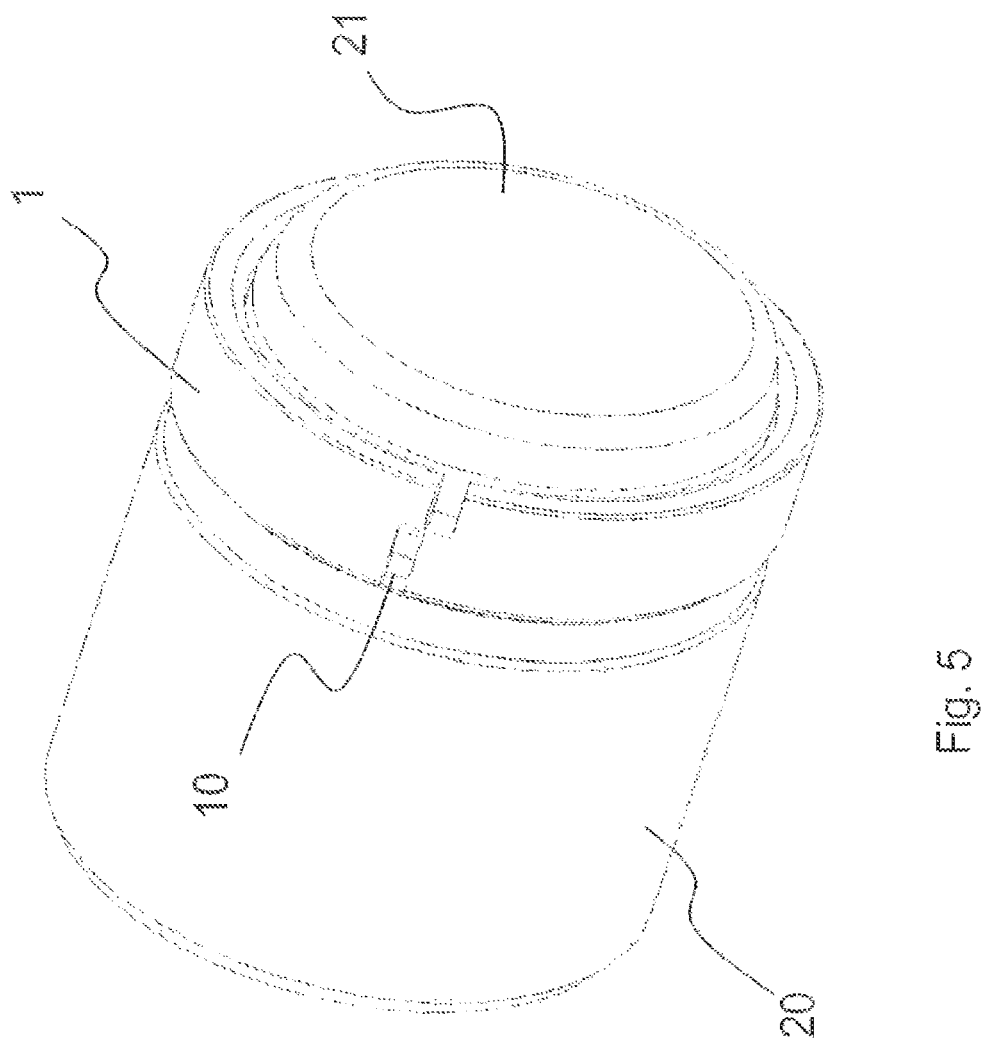

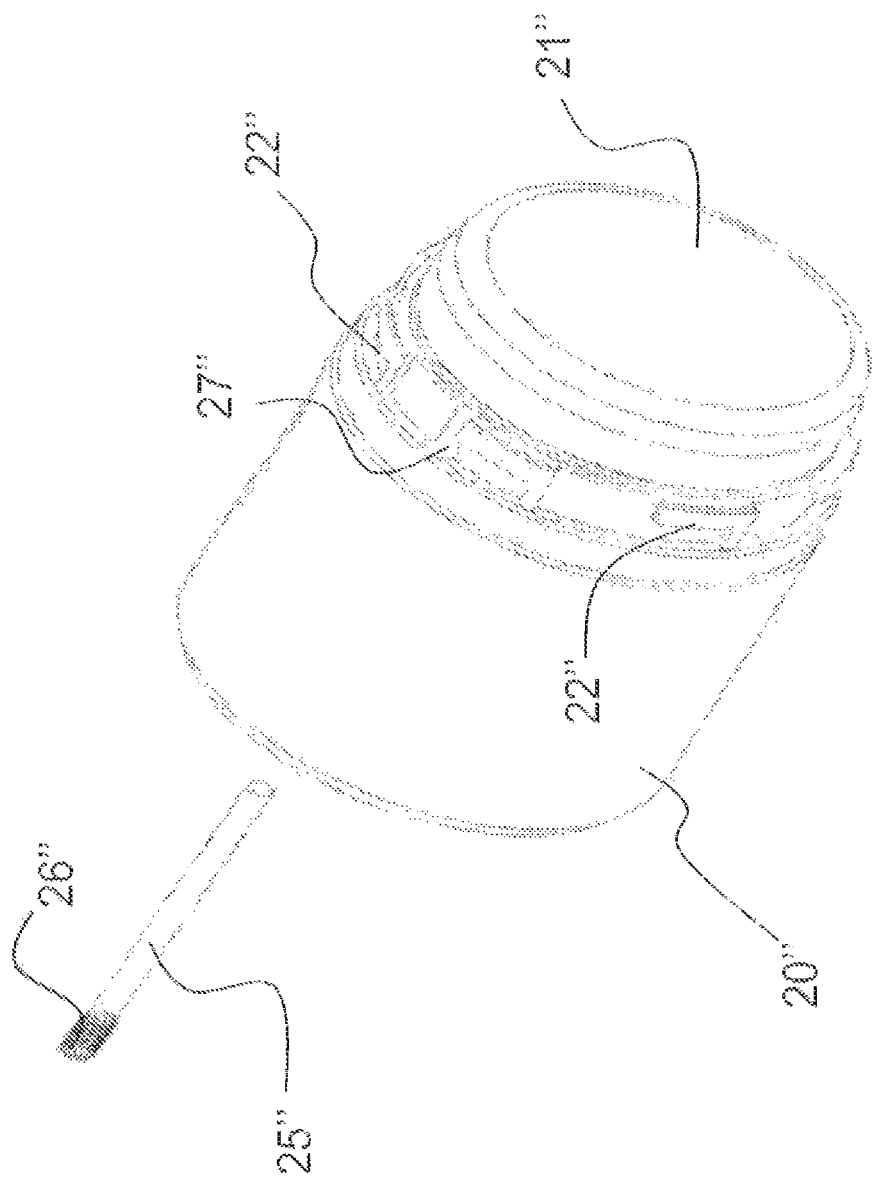

DIE CASTING PISTON AND RING ASSEMBLY

RELATED APPLICATIONS

This Application is a Continuation of U.S. National Stage application Ser. No. 13/145,695 filed under 35 U.S.C. Section 371, currently pending, of International Patent Application No. PCT/IB2010/050216 filed on Jan. 18, 2010, claiming priority to Italian Patent Application No. MI2009A000058 filed Jan. 21, 2009, all of which are hereby incorporated by reference as if fully set forth herein.

TECHNICAL FIELD

The present invention relates to a die casting piston and ring assembly, in particular for, without being limited to, cold-chamber die casting processes.

BACKGROUND OF THE INVENTION

It is appropriate to specify beforehand that, although in the following description reference will be made for simplicity mainly to cold-chamber die casting, this should not however be understood as a limiting factor, since the present invention is also applicable to, unless specifically incompatible with, other types of die casting processes (e.g. hot-chamber die casting) for metallic or non-metallic materials.

The cold-chamber die casting process has been known for a long time, and therefore it will not be described in detail below, with the exception of what is strictly needed in order to understand the invention. For further information, reference should be made to the numerous technical and scientific publications on this matter.

In this process, molten metal is poured into a container having a cylindrical inner cavity, in which the metal is pushed by a moving piston towards an axial outlet, thereby being injected into a die containing the mould of the part to be cast.

In order to improve the pressure exerted onto the molten metal by the piston, a known solution employs sealing rings much like those applied to pistons of internal-combustion engines, even though, of course, the different application requires specific technical measures.

Several types of sealing rings are now available for this purpose, which for simplicity may be divided into two different categories.

The first category is based on the principle of exploiting the infiltration of molten metal between the ring and the piston, thus causing the ring to expand radially and attaining the desired seal against the cylindrical inner wall of the container; one example of a ring of this kind has been described in European patent EP 1 197 279 granted in 2001.

The second category is based on creating a labyrinth seal between the ring inner surface and the piston, thanks to a conjugated configuration of both components, wherein the former has an annular groove and an annular rib matching the homologous annular groove and annular rib provided on the latter.

This labyrinth seal, along with a particular step-like shape of the cutout that confers elasticity to the ring, allows the latter to expand radially without the risk that molten metal may leak between the piston and the sealing ring.

One example of this technology has been described in European patent EP 423 413 granted in 1997.

While the aforementioned prior-art solutions give satisfactory results in terms of seal between the piston and the cylindrical wall of the container, they still have performance and reliability limits.

In fact, as far as the first one of these technologies is concerned, it must be noted that the metal that hardens between the ring and the piston due to the inevitable cooling occurring between one working cycle and the next causes the ring to lose elasticity, so that the friction thereof against the cylindrical wall of the container can become so high as to damage it or anyway bring about the risk of piston seizure.

It is probably for this reason that the sealing ring described in EP 1 197 279 is made of copper, i.e. a material softer than the steel of the container in which the piston slides. The sealing ring according to the second technology mentioned above does not suffer from these problems, since, as aforesaid, there is a labyrinth seal between the ring itself and the piston which, unlike the previous case, prevents infiltration of molten metal. However, in this solution the ring suffers from problems of angular position stability, due to the lack of a system capable of preventing it from turning relative to the piston through the effect of the forces generated during the die casting process.

The technical problem at the basis of the present invention is therefore to provide a piston and ring assembly having such structural and functional features as to overcome the above-mentioned drawbacks of the prior art.

Said problem is solved by a piston and ring assembly having the features set out in the appended claims.

BRIEF DESCRIPTION OF THE DRAWINGS

Said features and the advantageous effects attained by the invention will become more apparent from the following description referring to a non-limiting preferred embodiment illustrated in the annexed drawings, wherein:

FIGS. 1 and 2 are respective axonometric views of a sealing ring according to the invention;

FIG. 5 shows the ring and piston of the preceding figures in the assembled condition;

FIG. 9 is a view corresponding to those of FIGS. 7 and 8 of a further variant of the piston according to the invention.

DETAILED DESCRIPTION OF THE DRAWINGS

Figure 4:
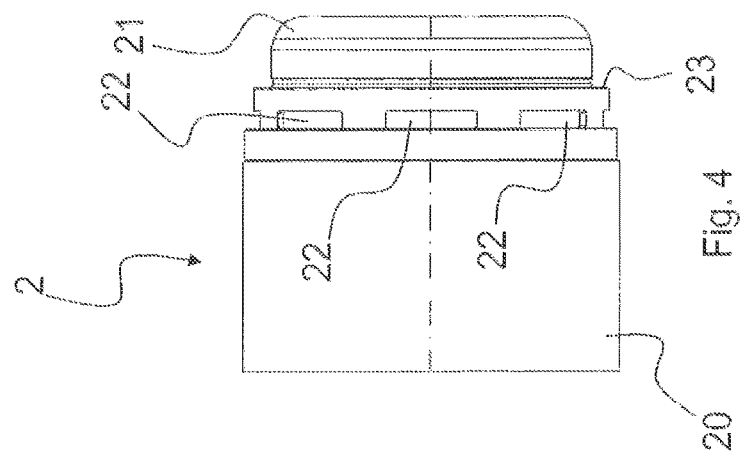
FIGS. 3 and 4 are respective axonometric and side views of a piston according to the invention, onto which the ring shown in the preceding figures is to be applied.
Figure 3:
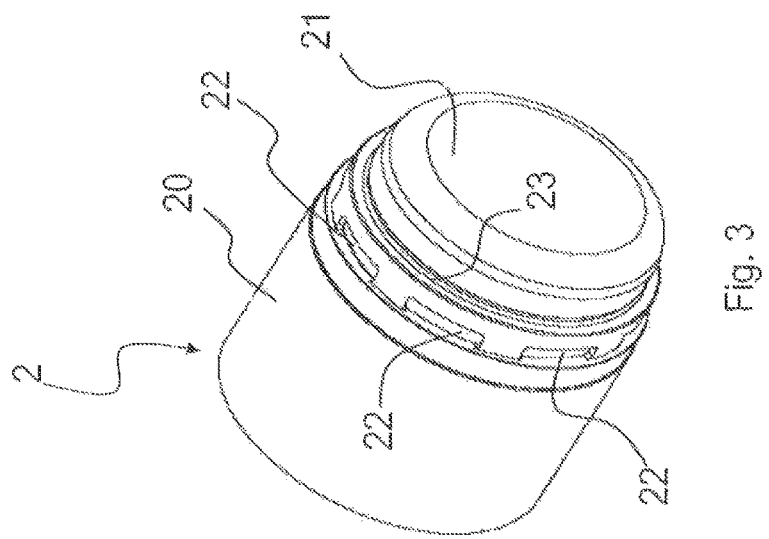

Referring now to the drawings, numeral 1 designates a sealing ring for a die casting piston 2 according to the invention.

The piston 2 is preferably made of copper, though it may alternatively be made of steel or any other appropriate metallic material; in any case, it is intended for being secured to a per se known piston carrier or rod, which is not shown in the drawings because it is unimportant for the purpose of understanding the present invention.

The sealing ring shown in FIGS. 1 and 2 is open, i.e. it has a cutout 10, preferably of the step-like type with horizontal surfaces touching each other.

Within the ring there are teeth 11 spaced evenly around the circumference in the proximity of the rear ring edge, i.e. the downstream edge in the direction of forward motion of the piston 2 during the die casting process; preferably, one edge of the teeth 11 is aligned with the ring edge.

According to a preferred embodiment, at the cutout 10 there are two teeth 11a, 11b which are smaller than the other ones, the combined length thereof being however substantially equal to the length of the teeth 11.

The latter protrude radially from an inner wall 13 of the ring, and their dimensions, i.e. their radial height from the inner wall 13 of the ring, their circumferential length and their axial width, may vary depending on several factors, such as ring diameter, ring width, ring position relative to the piston, number of teeth, etc.

It can nevertheless be stated that the number of teeth is preferably greater than two, more preferably between four and ten.

The piston 2 is made in one piece, preferably from copper or alloys thereof, even though other appropriate metallic materials may be used as an alternative, and has a cylindrical skirt 20 which is at least partly hollow internally, so that it can be secured to the support rod (not shown).

On the front side, the piston 1 has a tapered head 21, at the base of which there are seats 22 having a shape conjugated to that of the teeth 11 of the ring 1, but slightly larger: in this manner, when assembled for the die casting process (as shown in FIG. 5), with the teeth 11 engaged into the seats 22, there will be a slight (but not negligible) play between the ring and the piston which will allow the former to expand elastically with respect to the latter.

Furthermore, between the seats 22 and the end of the head 21 there is an abutment surface 23 against which, during the die casting process, the ring 1 is pushed by the pressure generated by the liquid metal: as a consequence, at said surface the ring will be kept axially in contact with the piston, thus preventing the molten metal from infiltrating past the ring.

The latter can however expand radially because of the above-mentioned play between the teeth and the seats, thus providing the desired seal against the cylindrical inner wall of the container.

In this regard, it must be pointed out that the teeth 11 will stay engaged in the respective seats 22, so that the ring 1 will remain stable in its assembled condition without turning relative to the piston 2.

In addition, it should be noted that the positioning of the teeth 11 at the rear edge of the ring 1, i.e. sufficiently far from the front edge, will prevent any molten metal from reaching the seats 22 and clog them after solidifying.

It is apparent that, should the seats become clogged, the ring would lose elasticity because it could no longer return to the initial retracted condition.

Moreover, the sealing ring 1 protects the seats 22 against any liquid metal coming from the outside, i.e. metal flowing down the wall of the cylindrical chamber in which the piston slides.

In other words, this means that the assembly consisting of the ring 1 and piston 2 is inherently reliable, since the ring itself protects the mating regions against infiltration of molten metal.

In the light of the above, it can therefore be understood how the ring 1 and the piston 2 are able to solve the technical problem at the basis of the present invention.

In fact, this assembly ensures the necessary seal by exploiting the elasticity of the ring 1; under this aspect, it can therefore be said that the invention falls within the second type of technology previously described, with all the advantages thereof.

However, unlike the cited prior art, the engagement between the teeth 11 and the seats 22 will prevent the ring from turning relative to the piston, thereby ensuring that the whole system operates properly.

This is attained by preserving the elastic behaviour of the ring, because the seal provided between the ring and the piston prevents any accumulation of molten metal which, when solidified, may cause the problems mentioned above with reference to some of the prior art.

In addition to those mentioned above, the invention also achieves further advantageous effects.

In fact, the presence of a plurality of teeth 11 and seats 22 in the ring 1 and piston 2, respectively, allows the ring to be positioned angularly relative to the latter in any configuration in accordance with the chosen coupling.

In other words, by selecting one combination among the various possible combinations offered by the teeth and seats, the ring 1 can be positioned accurately, for example, by choosing to locate the cutout 10 at the top, at the bottom, at a horizontal diameter or in intermediate angular positions.

This selective positioning of the ring 1 allows to compensate for any irregularity (out-of-round) of the cylindrical chamber in which the piston 2 slides, as well as for any imbalance in the pressure exerted onto the molten metal and other situations which may arise during the die casting process.

In this frame, it is important that the half-teeth 11a, 11b located at the cutout have smaller dimensions, so that they can engage any seat 22 just like the other teeth.

Another important advantage of the present invention is that the teeth within the ring can also be exploited for mounting the ring onto the piston in a bayonet fashion.

Figure 6:
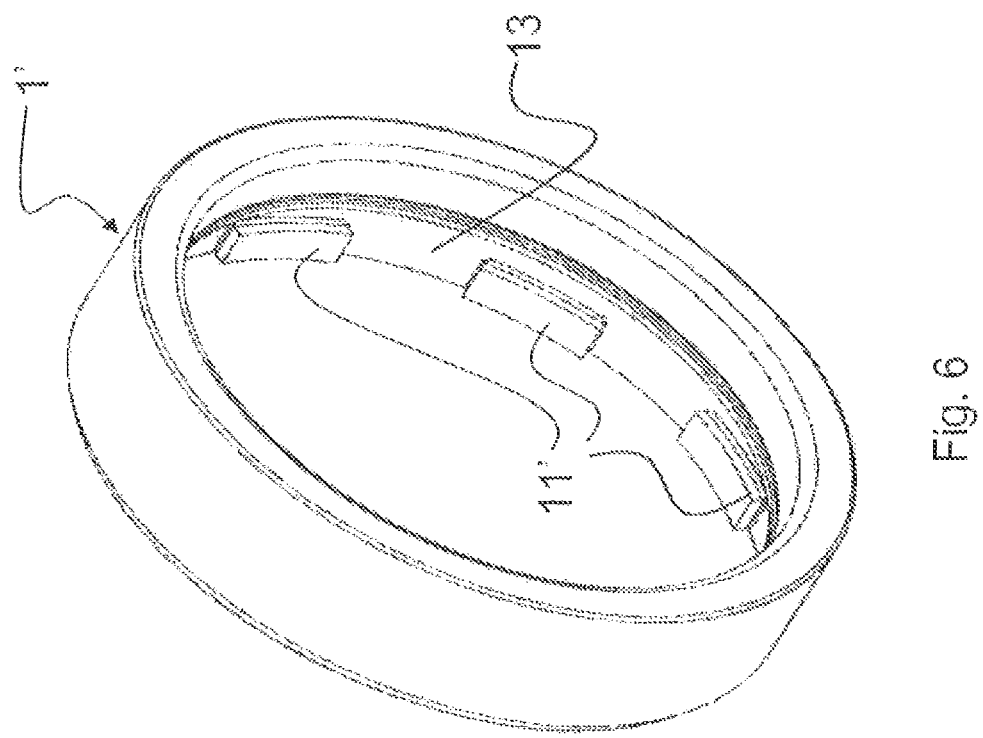
FIG. 6 is an axonometric view of a variant of the sealing ring according to the present invention.
Figure 7:
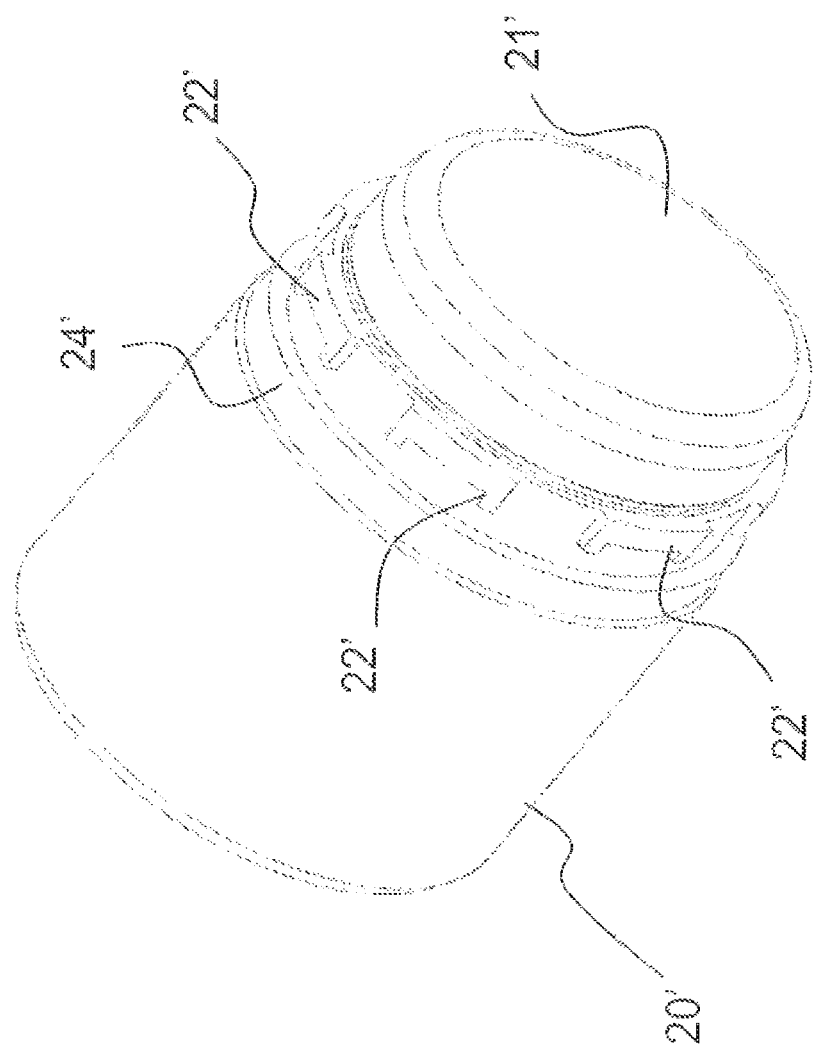
FIG. 7 is an axonometric view of a variant of the piston according to the invention, onto which the ring of FIG. 6 is to be applied.
Figure 8:
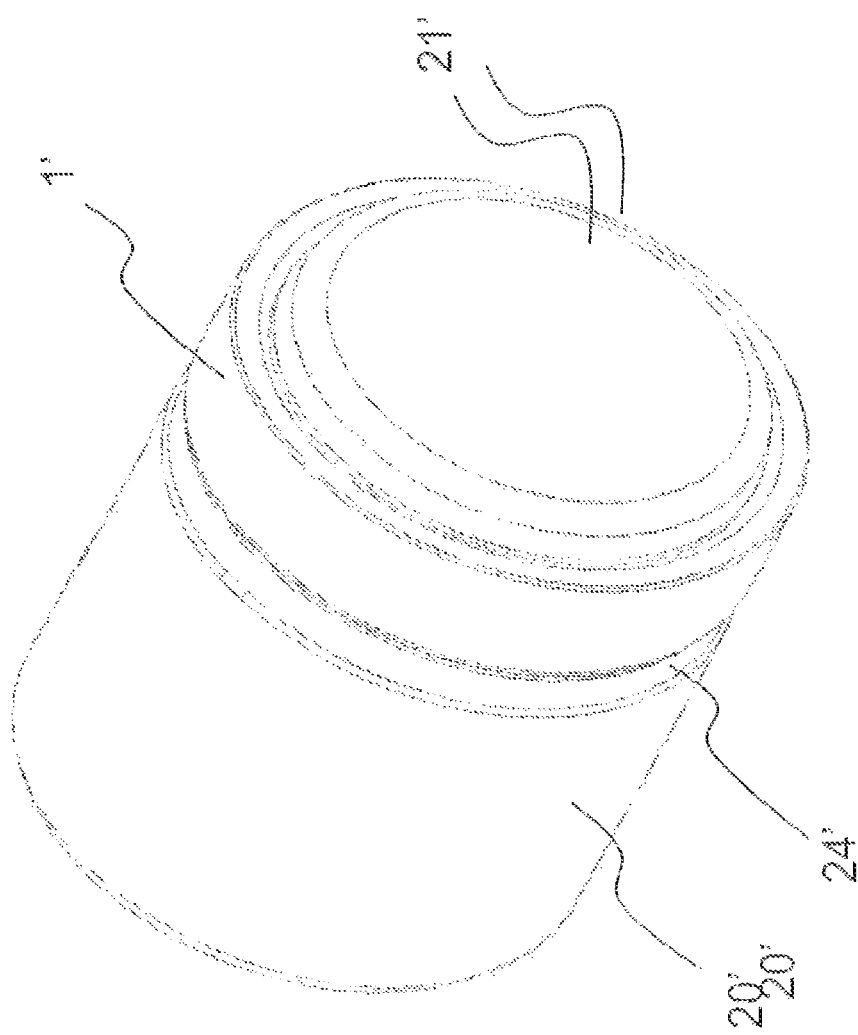
FIG. 8 shows the ring and piston of FIGS. 6 and 7 in the assembled condition.

This situation is particularly favourable whenever the ring is a closed ring, i.e. with no cutout, like the one shown in FIGS. 6, 7, 8 and 9, wherein those elements which are structurally or functionally equivalent to those described above are designated by the same reference numerals with the addition of an apostrophe.

As can be seen, in this case the ring 1' is slipped onto the piston 2' from the front side, and is then locked in position by turning it so as to bring its teeth 11' under seats 22' radially projecting from the piston 2', in accordance with a typical bayonet-type assembly.

In order to prevent any backward motion of the ring 10' and keep the latter in position, the piston 1' comprises a collar 24' consisting of a thin elastic ring that prevents the ring 10' from moving down and turning in the direction opposite to that of engagement between the teeth 11' and the seats 22'.

Several variations are also possible for the closed ring and bayonet-type mounting, as shown in FIG. 9.

In this case, the seats 22" are open on one side, thereby facilitating the bayonet mounting of the ring 1"; counter-rotation of the latter is prevented by a rod 25" extending in the piston skirt 20" and having a threaded retaining stem 26", which is screwed into a hole (not shown in the drawings) provided in the piston skirt 20".

The end of the rod 25" engages into a cavity 27" located at one of the seats 22", thereby preventing the ring 1" from turning.

Of course, other systems may be employed for preventing the ring from turning relative to the piston as an alternative to the collar 24' or rod 25"; a feature which is common to all these solutions is the ring with internal teeth according to the above teaching.

In this regard, it must be pointed out that closed rings are used in particular die casting applications, wherein the container end has no leads to the cylindrical chamber in which the piston slides.

The closed-ring variants of the invention attain the same results as the other solution previously described, since a seal is still provided between the ring 1', 1" and the piston 2', 2": as a matter of fact, the bayonet-type mounting ensures a slightly forced axial contact between the respective opposite surfaces, thus preventing infiltration of liquid metal past the ring.

Furthermore, this bayonet-type mounting allows the ring to be positioned angularly relative to the piston in a selective and accurate manner too, since a plurality of combinations are made possible by the multiple teeth 11', 11" and radial seats 22', 22": even though in this case there is no cutout, it is nevertheless advantageous that the ring 1', 1" can be positioned according to predetermined angular configurations.

As a further possible variant of what has been described and illustrated so far, it should be mentioned that one piston may be fitted with two or more sealing rings, as already known in the art.

Therefore, a piston may have one open ring 1 and one closed ring 1', or two rings of the same type (open or closed).

Finally, referring back to the initial preamble, it must be pointed out that the above description of pistons and rings for cold-chamber die casting processes may be applicable to other types of processes as well, not necessarily involving metal (e.g. for plastic materials).

Of course, the shape of the teeth 11, 11' and seats 22, 22' may be different from that shown in the drawings, wherein both have a quadrilateral shape.

Thus, for instance, it is conceivable to employ teeth similar to pins and seats similar to elongated holes, or different geometries as well; when open rings (i.e. with a cutout) are used, it will however be necessary to provide for a certain play in the coupling between the teeth and the seats, so as to allow the ring to expand elastically as explained.

All of these variants will still fall within the scope of the following claims.

What is claimed is:

1. A die casting piston comprising:
   a side skirt;
   a front head, with reference to a direction of forward motion thereof comprising a plurality of laterally arranged seats;
   an abutment surface located between the plurality of laterally arranged seats and an end of the front head; and
   a sealing ring positioned around the front head and the abutment and having a plurality of teeth projecting therefrom, the sealing ring retained to the front head via an elastic behavior.

2. The die casting piston of claim 1, wherein the plurality of laterally arranged seats are arranged near a base of the front head.

3. The die casting piston of claim 1, wherein the plurality of laterally arranged seats are spaced evenly.

4. The die casting piston of claim 1 further comprising:
   a means for retaining adapted to prevent the sealing ring from turning relative to the piston.

5. The die casting piston of claim 4 wherein the means for retaining comprises a rod passing through the skirt of the piston.

6. The die casting piston of claim 1 further comprising:
   a means for retaining adapted to prevent the ring from turning relative to the piston,
   wherein the means for retaining comprises an elastic collar at a base of the front head and arranged between the sealing ring and the abutment surface.

7. A die casting piston assembly comprising:
   a die casting piston having a side skirt and a front head with reference to the direction of forward motion thereof in the die casting process;
   a plurality of laterally arranged seats;
   an abutment surface located between the plurality of laterally arranged seats and an end of the front head; and
   a sealing ring around the front head and the abutment surface having a plurality of radially inward projecting teeth located in proximity to a rear edge of the sealing ring with respect to the direction of forward motion of the die casting piston, wherein the plurality of laterally arranged seats engage the teeth projecting radially inward from the sealing ring to maintain stability between the piston head and sealing ring in an assembled condition of the die casting piston assembly.

8. The die casting piston assembly of claim 7, wherein the teeth are spaced evenly.

9. The die casting piston assembly of claim 7 further comprising:
   a cutout at which two half-teeth are arranged on opposite sides with respect thereto.

10. The die casting piston assembly of claim 7, wherein the sealing ring is a closed sealing ring.

11. The die casting piston assembly of claim 7, wherein a total number of teeth is in the range between 4 and 10.

12. The die casting piston assembly of claim 7, wherein the seats are arranged near a base of the front head.

13. The die casting piston assembly of claim 7, wherein the seats are spaced evenly.

14. The die casting piston assembly of claim 7, wherein the piston comprises retaining means adapted to prevent the sealing ring from turning relative to the die casting piston.

15. The die casting piston assembly according to claim 14, wherein the retaining means comprises a rod passing through the side skirt of the die casting piston.

16. The die casting piston assembly according to claim 14, wherein the retaining means comprises an elastic collar at a base of the front head and arranged between the sealing ring and the abutment surface.

17. The die casting piston assembly of claim 7 wherein the teeth are aligned with the rear edge of the sealing ring.

18. The die casting piston assembly of claim 7 wherein the teeth abut the rear edge of the sealing ring.

19. The die casting piston of claim 7 wherein the teeth are aligned with the rear edge of the sealing ring and are located closer to the rear edge of the sealing ring than to an opposite edge of the sealing ring.

20. The die casting piston of claim 7 wherein during a die casting process, the sealing ring is pushed by a pressure generated by a liquid metal, wherein at the abutment surface, the sealing ring is axially in contact with the piston, wherein the liquid metal is prevented from infiltrating past the sealing ring.

21. A die casting piston comprising:
    a side skirt;
    a front head;

an abutment surface located on the front head; and a sealing ring positioned around the front head and the abutment wherein the abutment is located between the sealing ring and an end of the front head;

wherein during a die casting process the sealing ring is pushed by a pressure generated by a liquid metal against the abutment surface.

22. The die casting piston of claim 21 wherein the sealing ring is axially in contact with the piston and has a plurality of radially inward projecting teeth engaging a plurality of laterally arranged seats on the front head to maintain stability between the front head and sealing ring in an assembled condition of the die casting piston, wherein the liquid metal is prevented from infiltrating past the sealing ring.

\* \* \* \* \*

UNITED STATES PATENT AND TRADEMARK OFFICE
CERTIFICATE OF CORRECTION

Page 1 of 1

PATENT NO. : 9,829,108 B2
APPLICATION NO. : 14/592738
DATED : November 28, 2017
INVENTOR(S) : Brondolin It is certified that error appears in the above-identified patent and that said Letters Patent is hereby corrected as shown below:

On the Title Page

After Item (63) please insert:
--(30) Foreign Application Priority Data
Jan. 21, 2009   (IT) .................. MI2009A000058--

Signed and Sealed this
Sixth Day of February, 2018

Joseph Matal
*Performing the Functions and Duties of the*
*Under Secretary of Commerce for Intellectual Property and*
*Director of the United States Patent and Trademark Office*